Figure 12:
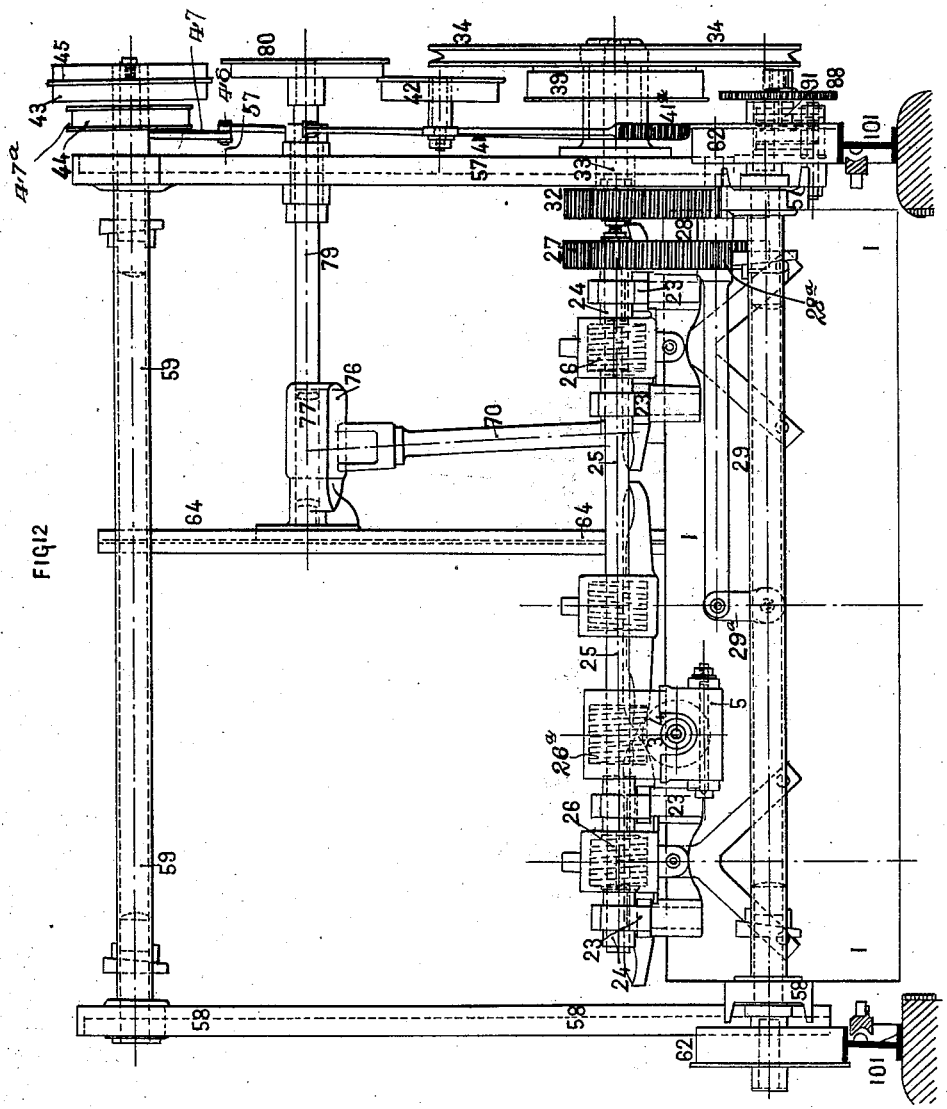

(No Model.)   18 Sheets—Sheet 1.
J. A. SALADIN.
MALT STIRRER.
No. 606,586.   Patented June 28, 1898.
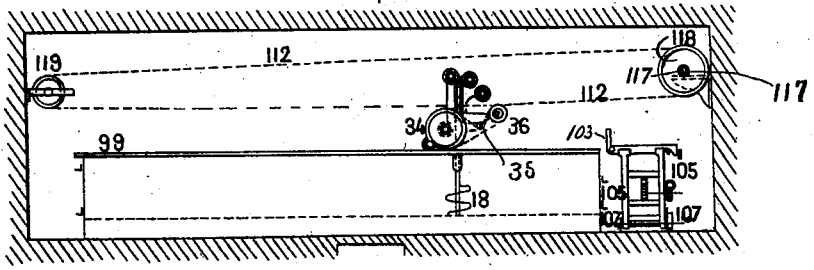
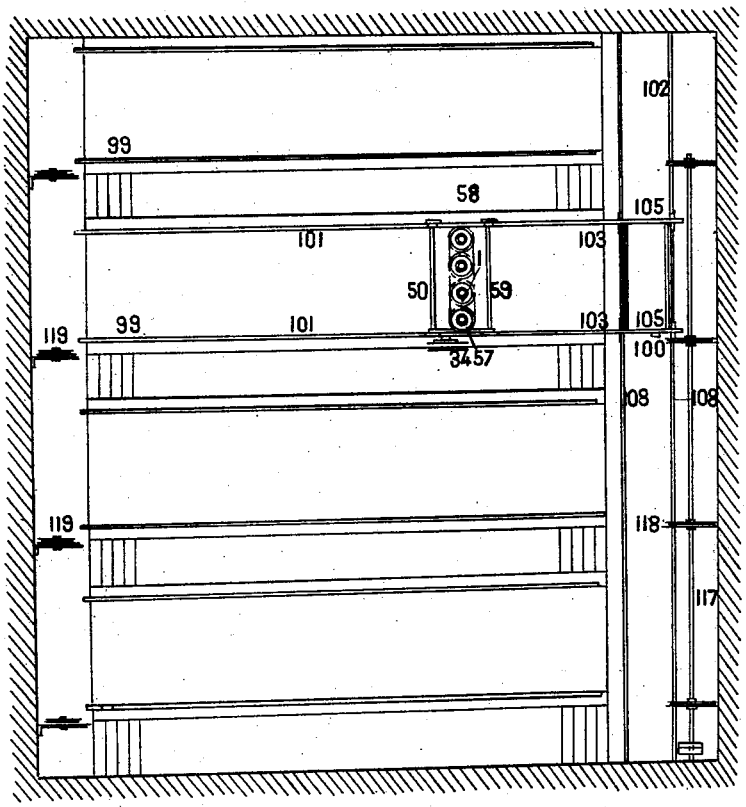
Witnesses
Philip N. Tilden
Robert Emmett
Inventor
Jules A. Saladin.
By James L. Norris
Atty.
THE NORRIS PETERS CO., PHOTO-LITHO., WASHINGTON, D. C.

(No Model.)
J. A. SALADIN.
MALT STIRRER.
No. 606,586.
18 Sheets—Sheet 2.
Patented June 28, 1898.
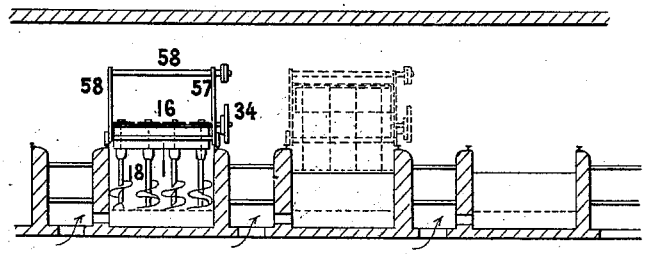
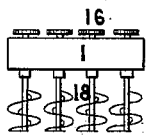 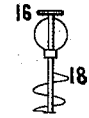
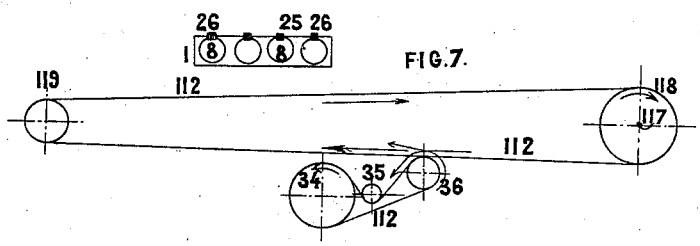
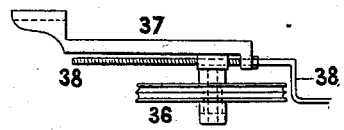

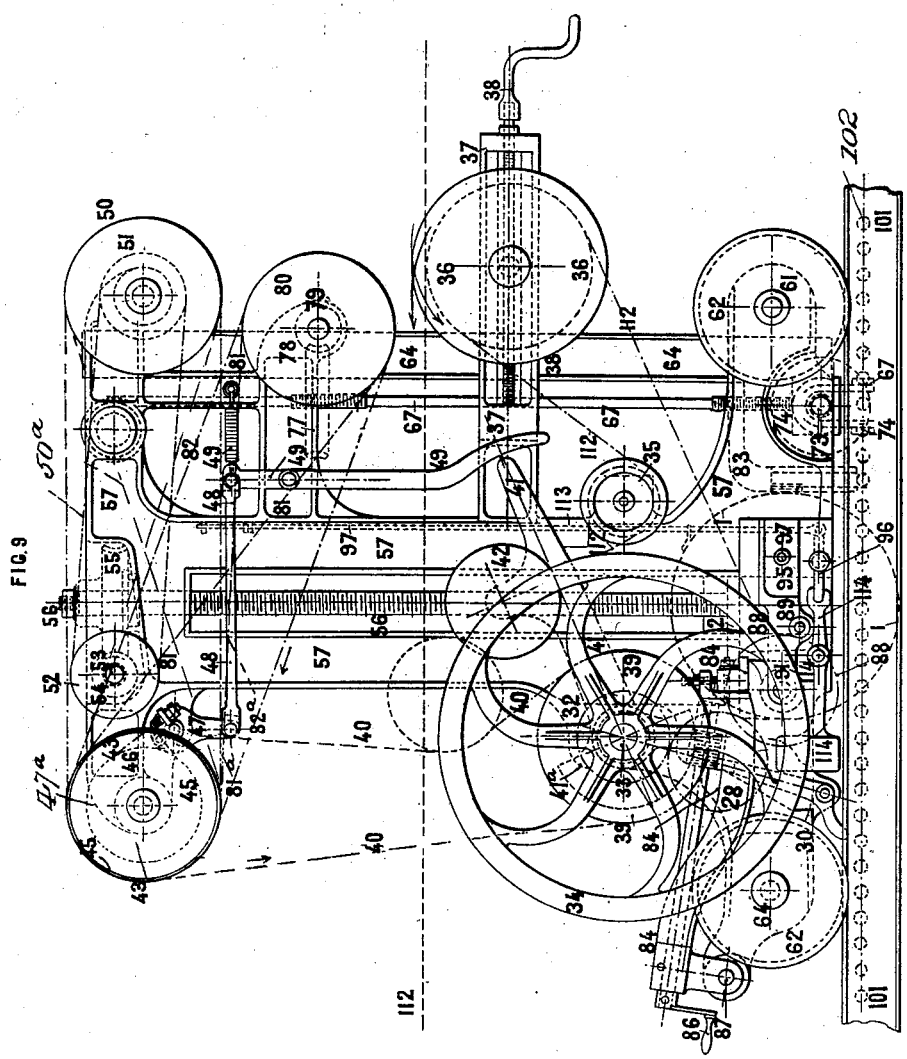

(No Model.)  18 Sheets—Sheet 4.
J. A. SALADIN.
MALT STIRRER.
No. 606,586.  Patented June 28, 1898.
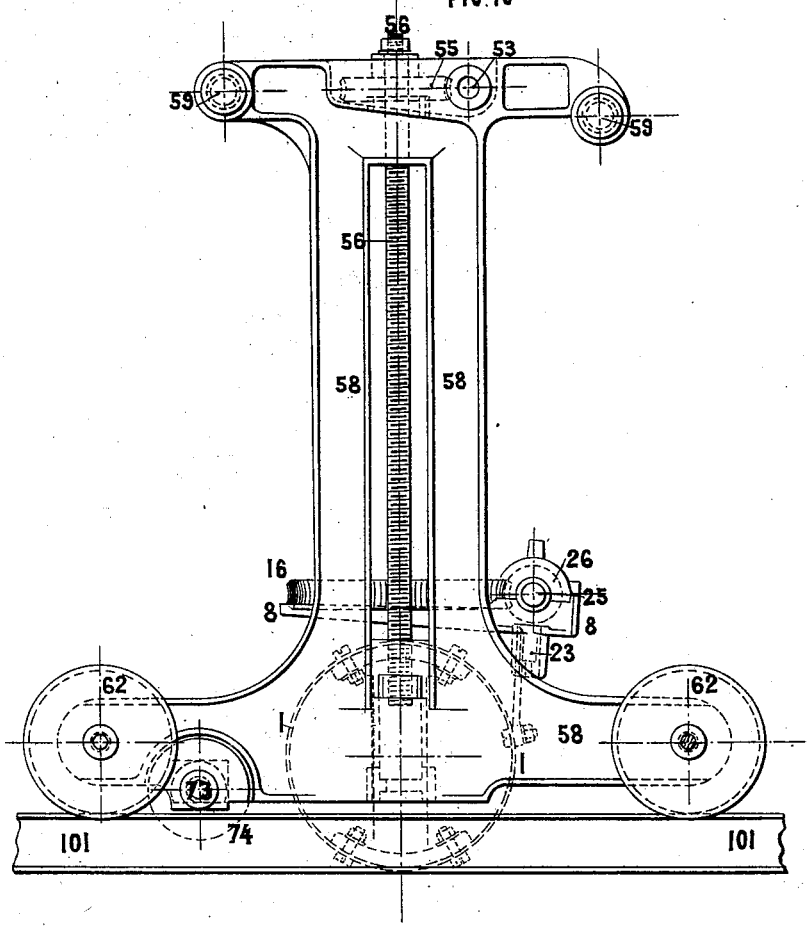
Witnesses
Philip N. Tilden.
Robert Emmett.
Inventor
Jules A. Saladin.
By James L. Norris.
Atty.

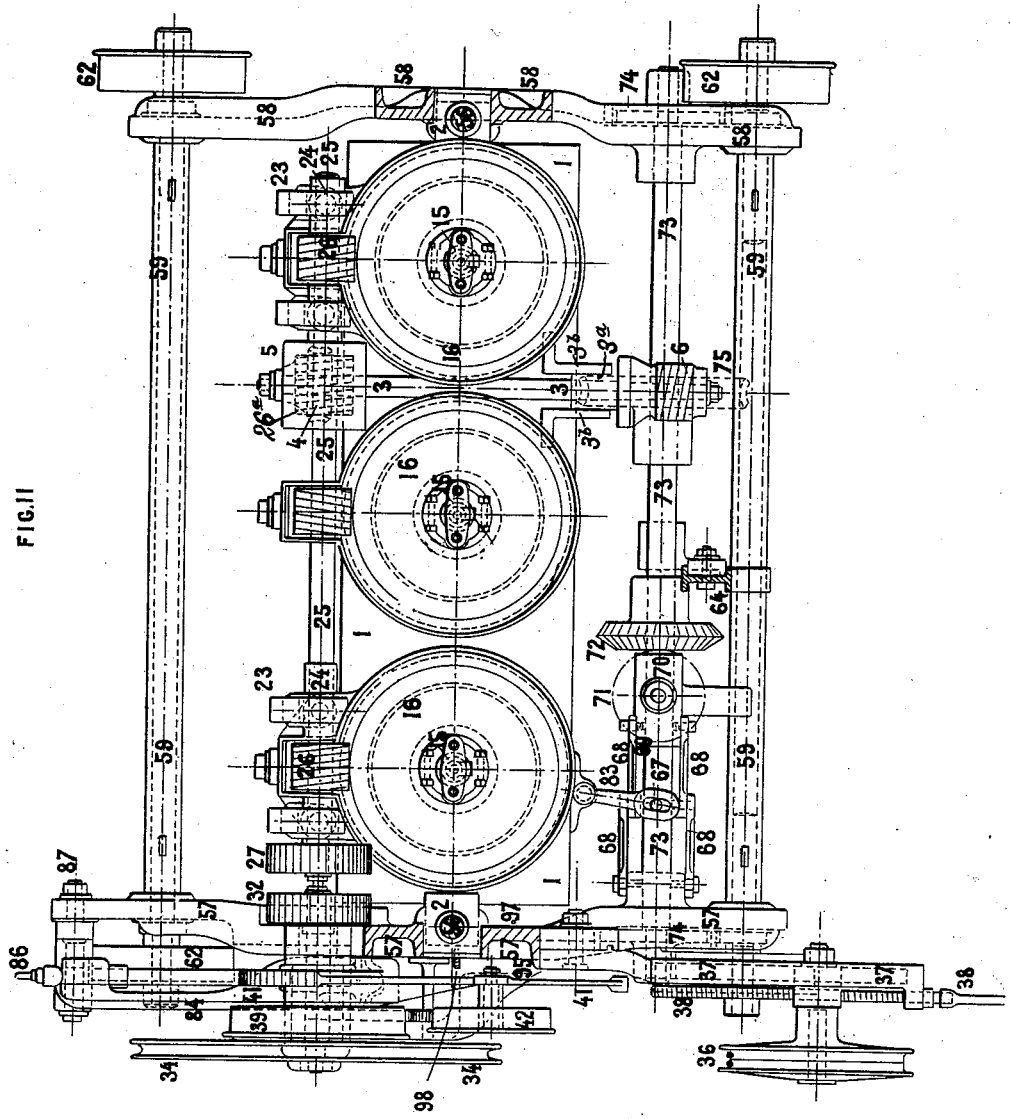

(No Model.)  18 Sheets—Sheet 6.

J. A. SALADIN.
MALT STIRRER.

No. 606,586. Patented June 28, 1898.

Witnesses
Philip N. Holden
Robert Everett

Inventor
Jules A. Saladin
By James L. Norris
Atty.

(No Model.)  18 Sheets—Sheet 7.

J. A. SALADIN.
MALT STIRRER.

No. 606,586.  Patented June 28, 1898.

Witnesses
Philip N. Tilden
Robert Everett

Inventor
Jules A. Saladin,
By James L. Norris,
Atty.

(No Model.)
18 Sheets—Sheet 9.
J. A. SALADIN.
MALT STIRRER.
No. 606,586.
Patented June 28, 1898.
FIG 15
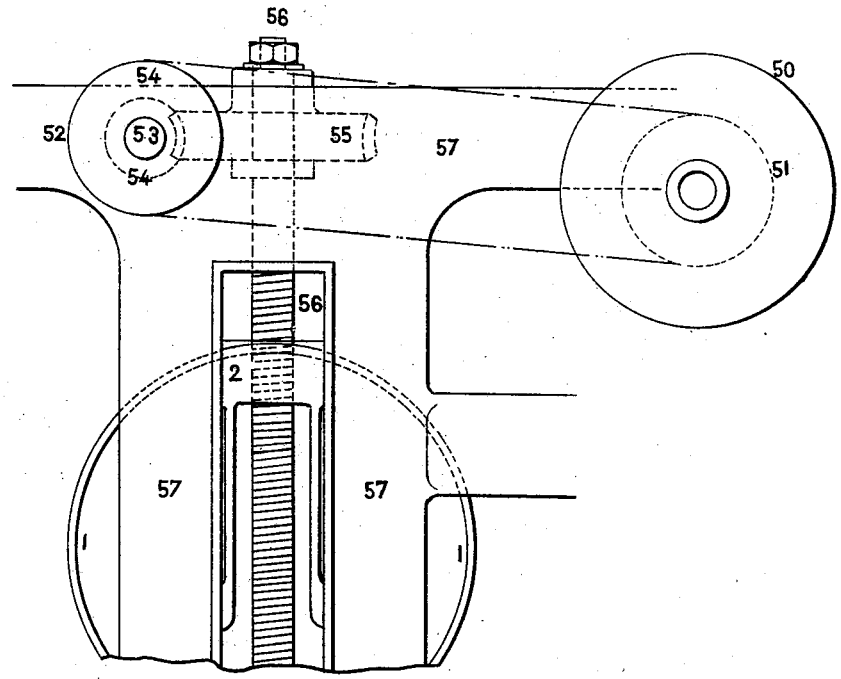
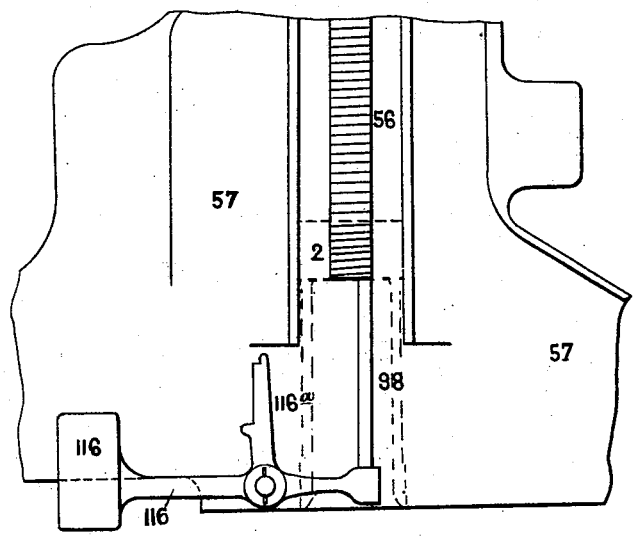
Witnesses
Philip N. Tilden
Robert Emmett
Inventor
Jules A. Saladin.
By James L. Norris.
Atty.

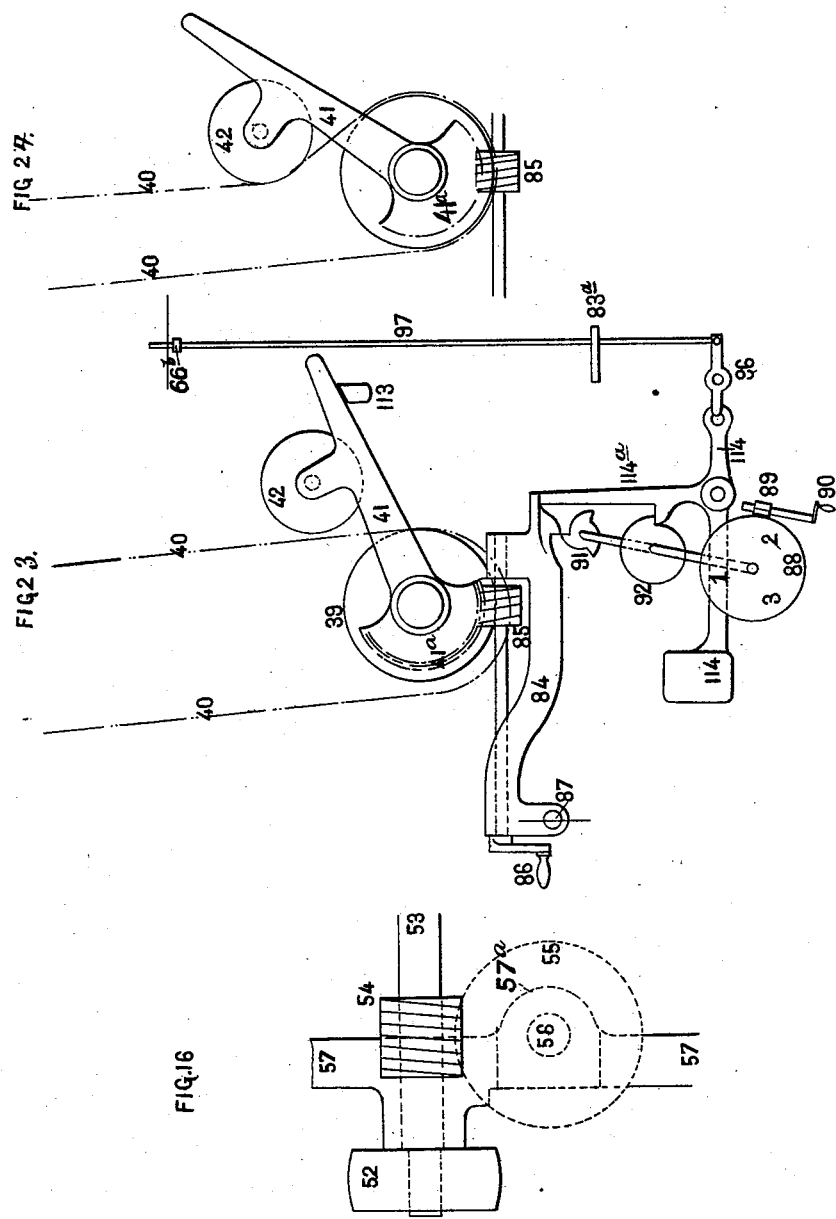

(No Model.)  
J. A. SALADIN.  
MALT STIRRER.  
No. 606,586. Patented June 28, 1898.
18 Sheets—Sheet 11.
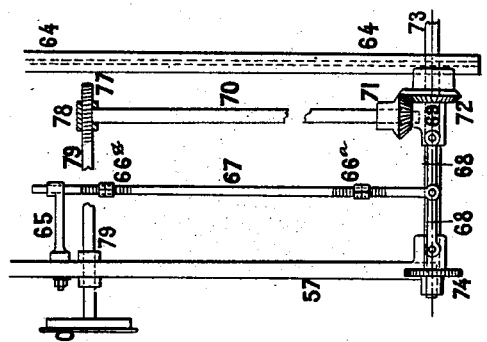
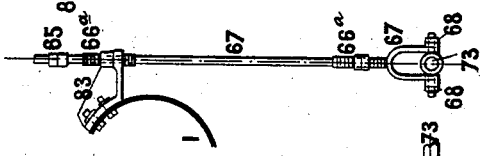
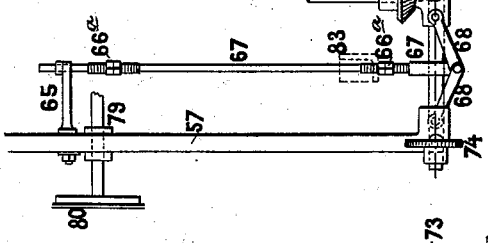
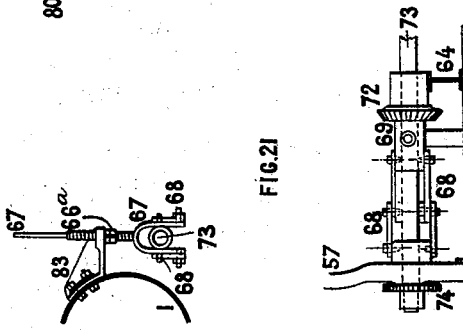
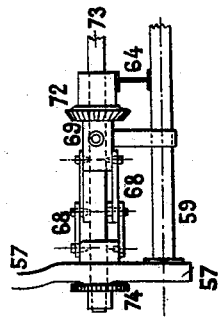
Witnesses  
Philip N. Tilden  
Robert Ewell
Inventor  
Jules A. Saladin,  
By James L. Norris.  
Atty.
THE NORRIS PETERS CO., PHOTO-LITHO., WASHINGTON, D. C.

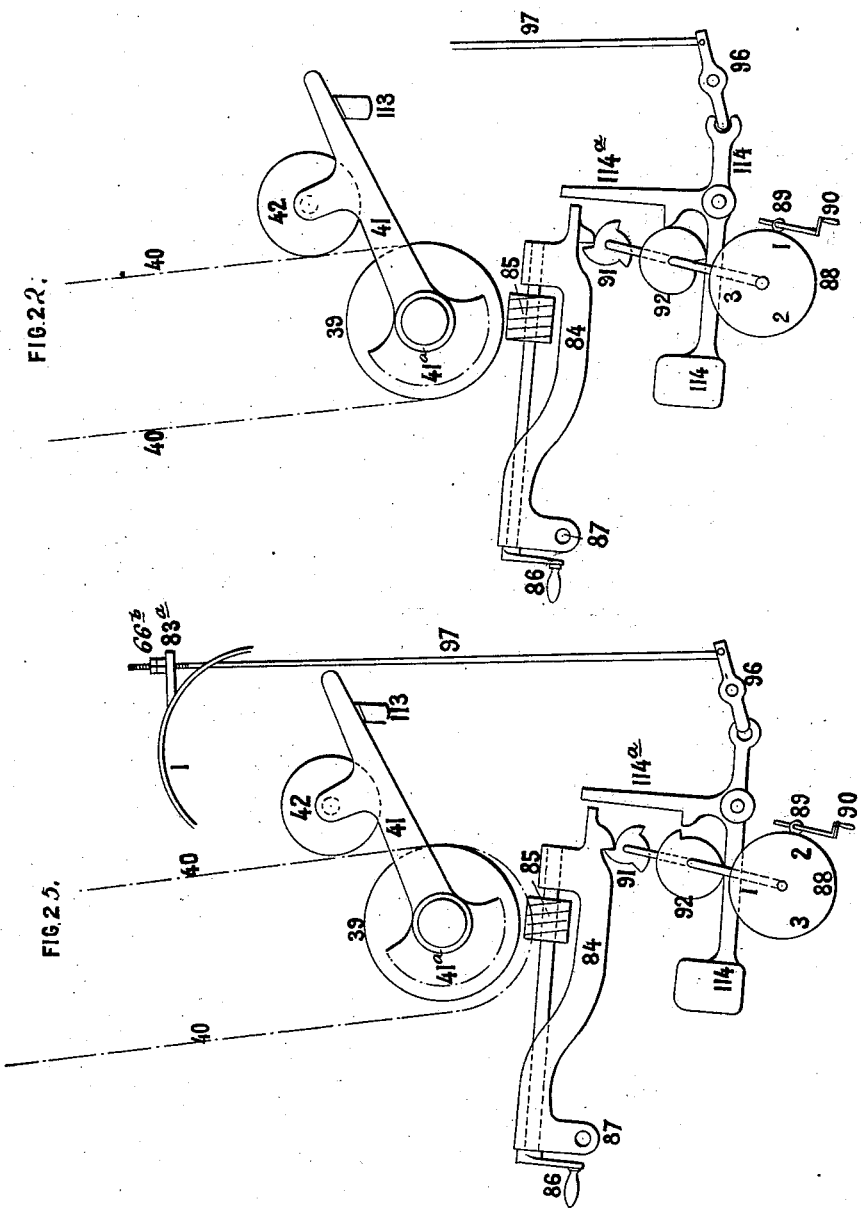

(No Model.)   18 Sheets—Sheet 13.
J. A. SALADIN.
MALT STIRRER.
No. 606,586.  Patented June 28, 1898.
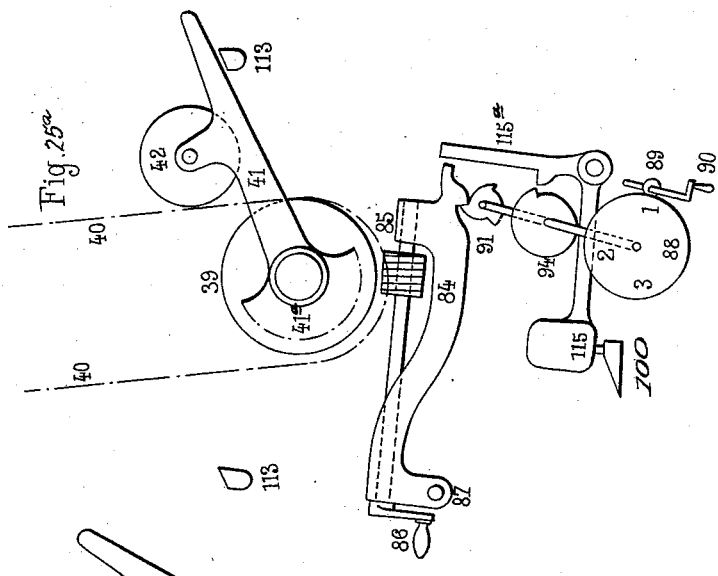
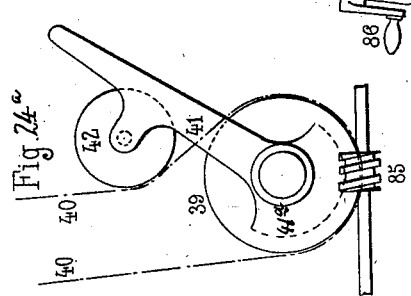
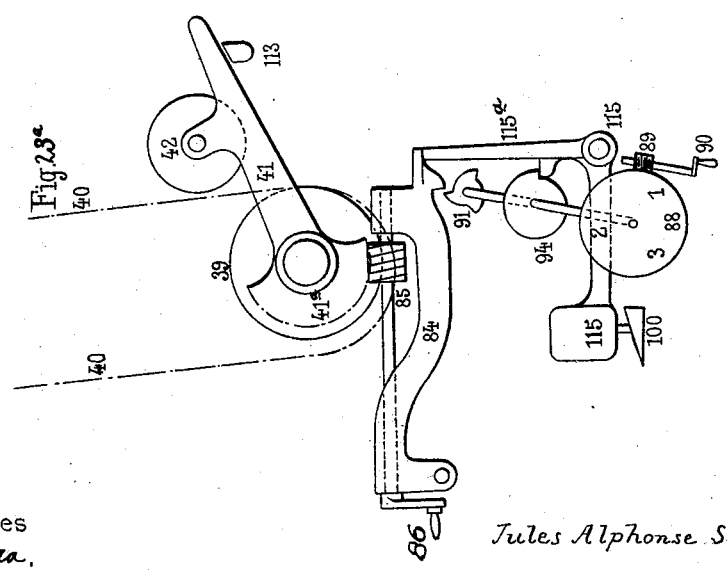
Witnesses
Geo. W. Rea.
Dennis Sumby.
Inventor
Jules Alphonse Saladin,
By James L. Norris
Atty (No Model.)  18 Sheets—Sheet 14.
J. A. SALADIN.
MALT STIRRER.
No. 606,586. Patented June 28, 1898.
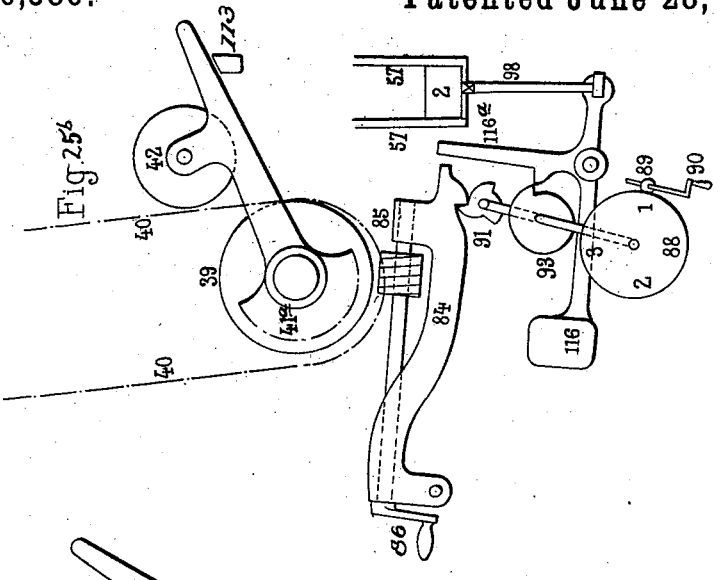
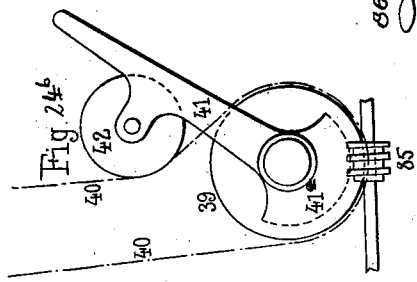
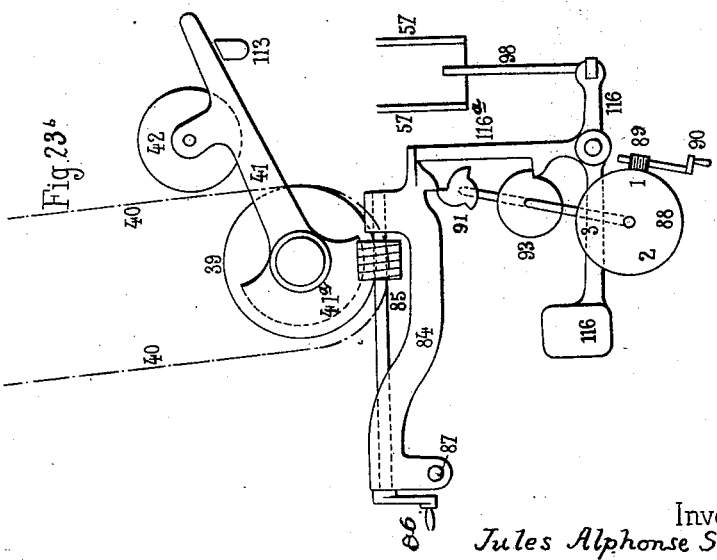
Witnesses
Gro. W. Rea
Dennis Sumby
Inventor
Jules Alphonse Saladin,
By James L. Norris.
Atty.
THE NORRIS PETERS CO., PHOTO-LITHO., WASHINGTON, D. C.

(No Model.)
J. A. SALADIN.
MALT STIRRER.
No. 606,586.
Patented June 28, 1898.
18 Sheets—Sheet 15.
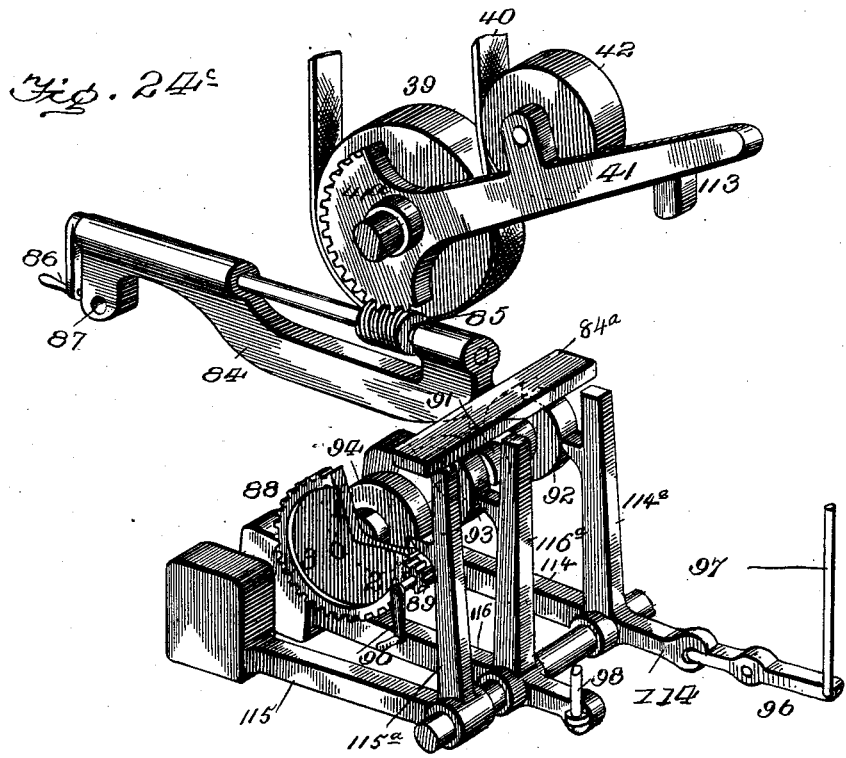
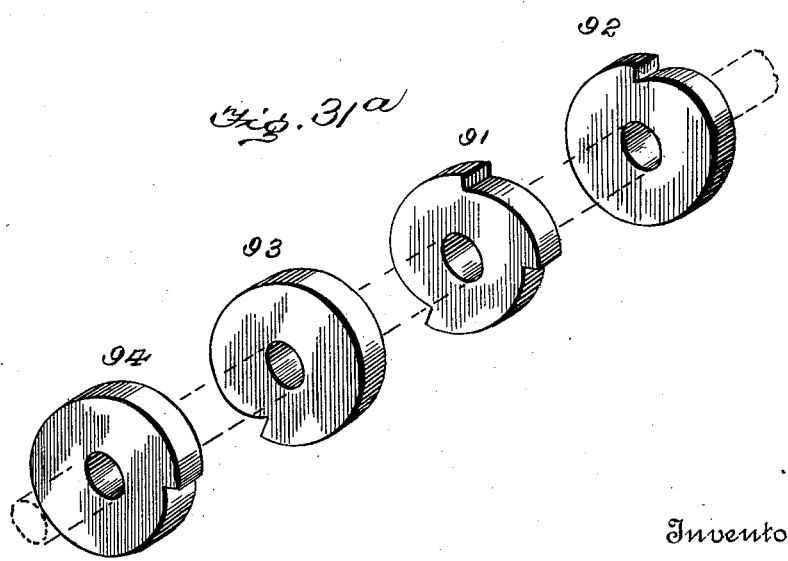
Witnesses
Inventor
Jules Alphonse Saladin
by James L. Norris
Attorney (No Model.) 18 Sheets—Sheet 16.
J. A. SALADIN.
MALT STIRRER.
No. 606,586. Patented June 28, 1898.
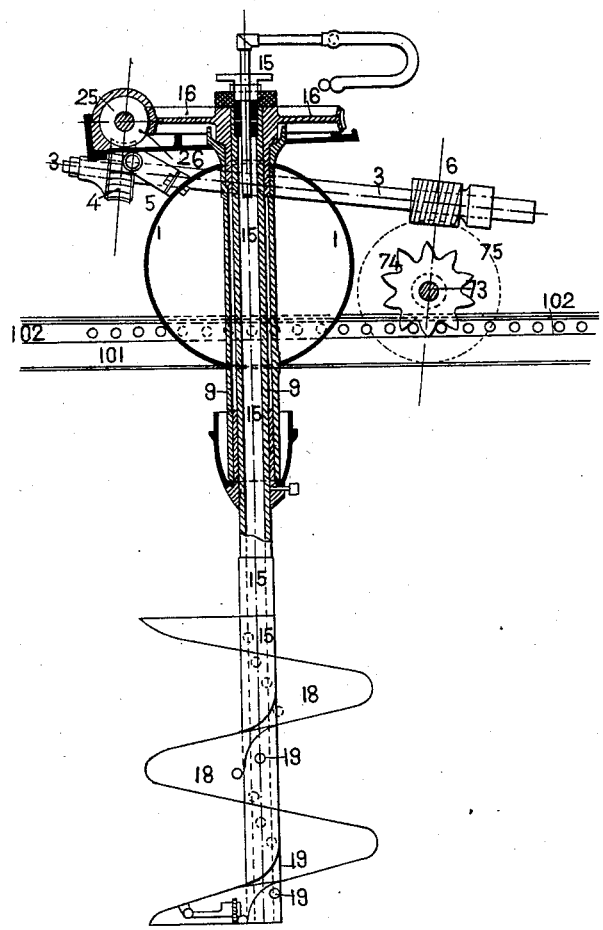
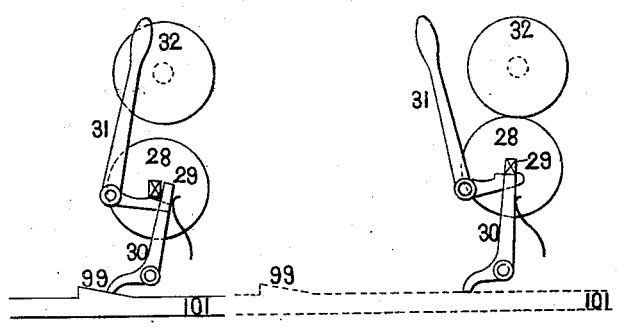
Witnesses
Philip N. Tiklen
Robert Evratt
Inventor
Jules A. Saladin,
By James L. Norris.
Atty.
THE NORRIS PETERS CO., PHOTO-LITHO., WASHINGTON, D. C.

(No Model.) 18 Sheets—Sheet 17.
J. A. SALADIN.
MALT STIRRER.
No. 606,586. Patented June 28, 1898.
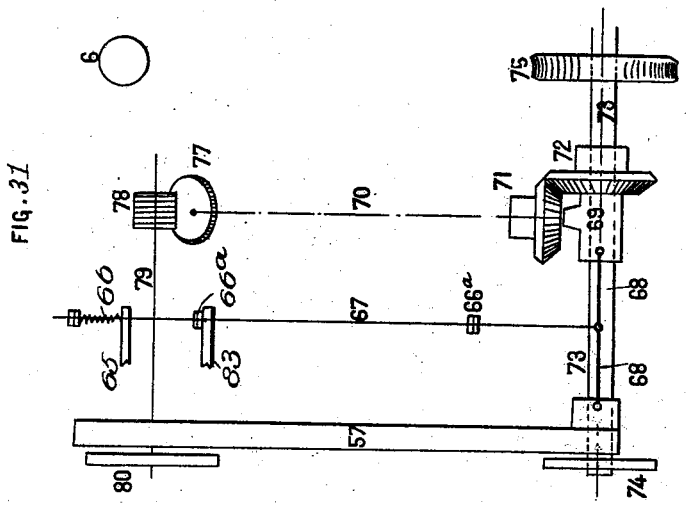
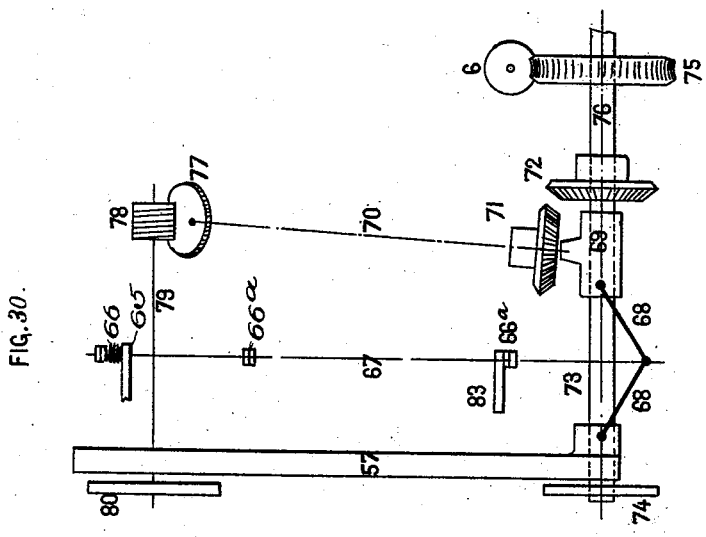
Witnesses
Philip N. Hilden
Robert Everett
Inventor
Jules A. Saladin
By James L. Norris
Atty.

(No Model.) 18 Sheets—Sheet 18.
J. A. SALADIN.
MALT STIRRER.
No. 606,586. Patented June 28, 1898.
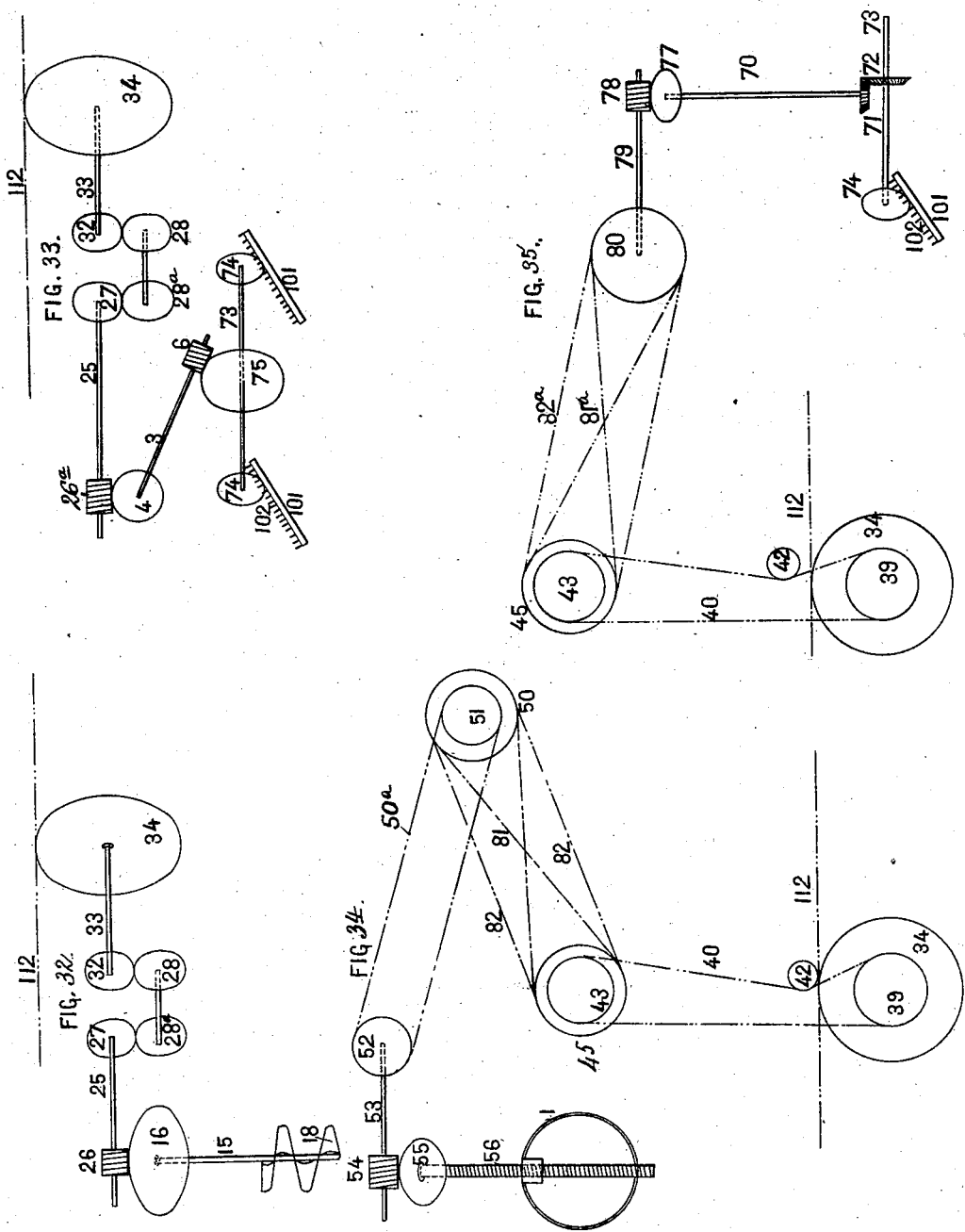
Witnesses
Philip N. Tilden
Robert Everitt
Inventor
Jules A. Saladin.
By James L. Norris
Atty.

UNITED STATES PATENT OFFICE.

JULES ALPHONSE SALADIN, OF NANCY, FRANCE.

MALT-STIRRER.

SPECIFICATION forming part of Letters Patent No. 606,586, dated June 28, 1898.

Application filed May 3, 1895. Serial No. 548,593. (No model.) Patented in England September 3, 1891, No. 14,887, and in Germany October 19, 1892, No. 64,810.

*To all whom it may concern:*

Be it known that I, JULES ALPHONSE SALADIN, a citizen of France, and a resident of Nancy, in the Department of Meurthe-et-Moselle, France, have invented a new and useful Improvement in Malting Apparatus, of which the following is a specification.

My invention relates to an improved apparatus for automatically turning over grain, which constitutes the second operation in the process of malting for the manufacture of beer, for which I have obtained Letters Patent in Germany, dated October 19, 1892, No. 64,810, and in Great Britain, dated September 3, 1891, No. 14,887.

The object of my invention is to improve the turning-over mechanism patented to me heretofore upon the 18th day of November, 1890, Letters Patent No. 440,850, and upon the 8th day of November, 1892, No. 485,986.

It is my purpose to provide improved mechanism for propelling the turning-over carriage in both directions, for raising and lowering the spiral shovels at the end of each movement of the carriage and before beginning the next movement, and for initiating and terminating those operations of the mechanism which are automatic.

It is my purpose also to improve the construction, arrangement, and operation of the gearing and of those parts which mesh and unmesh the same at different points in the operation of the turning-over mechanism.

It is my purpose also to provide an improved system of belting the pulleys of the machine and to combine therewith an improved tension device for producing an operative engagement of the belt.

My invention also comprises other novel features, all of which will be fully described in the following specification and then particularly pointed out and defined in the claims.

I will describe my invention with reference to the accompanying drawings, which illustrate, by way of example, apparatus constructed according to my said invention.

Figure 13:
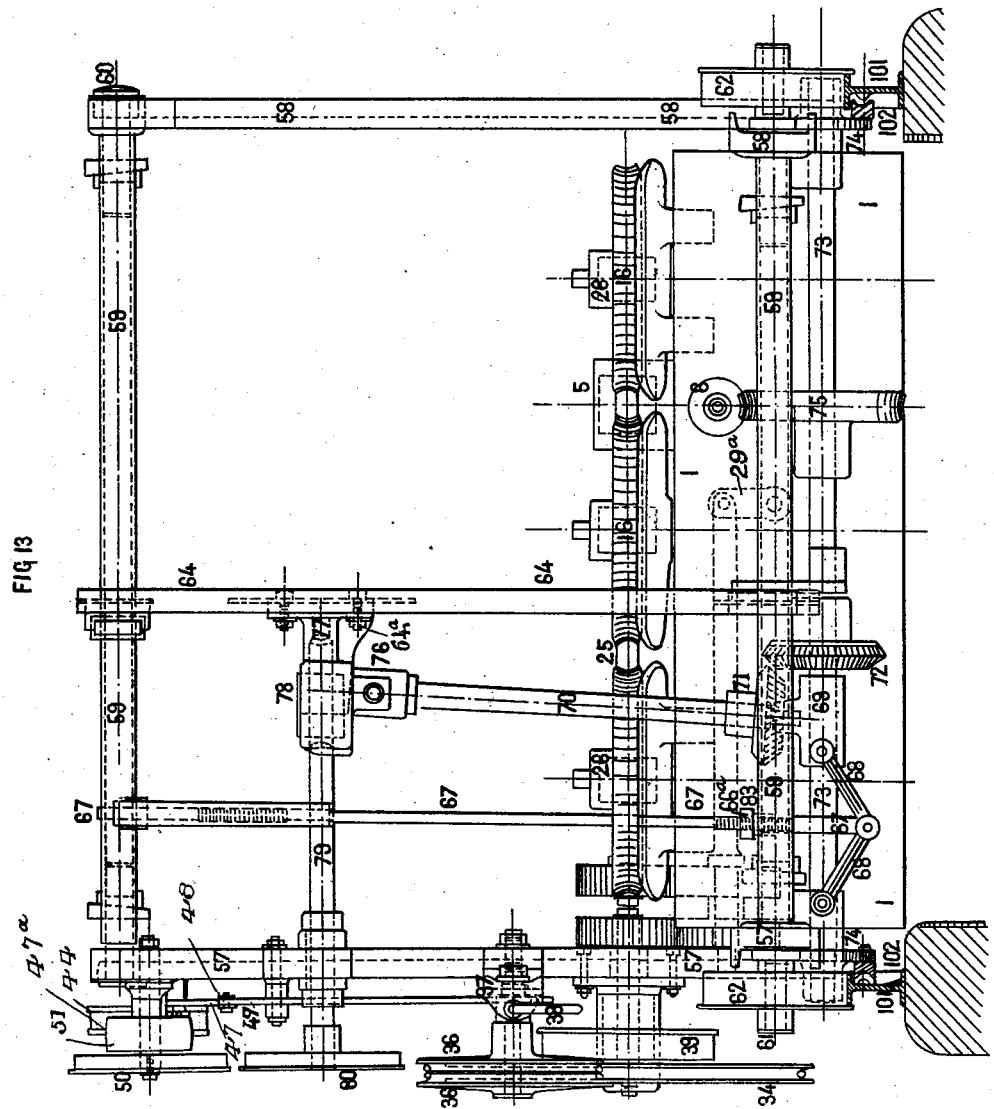
Figure 14:
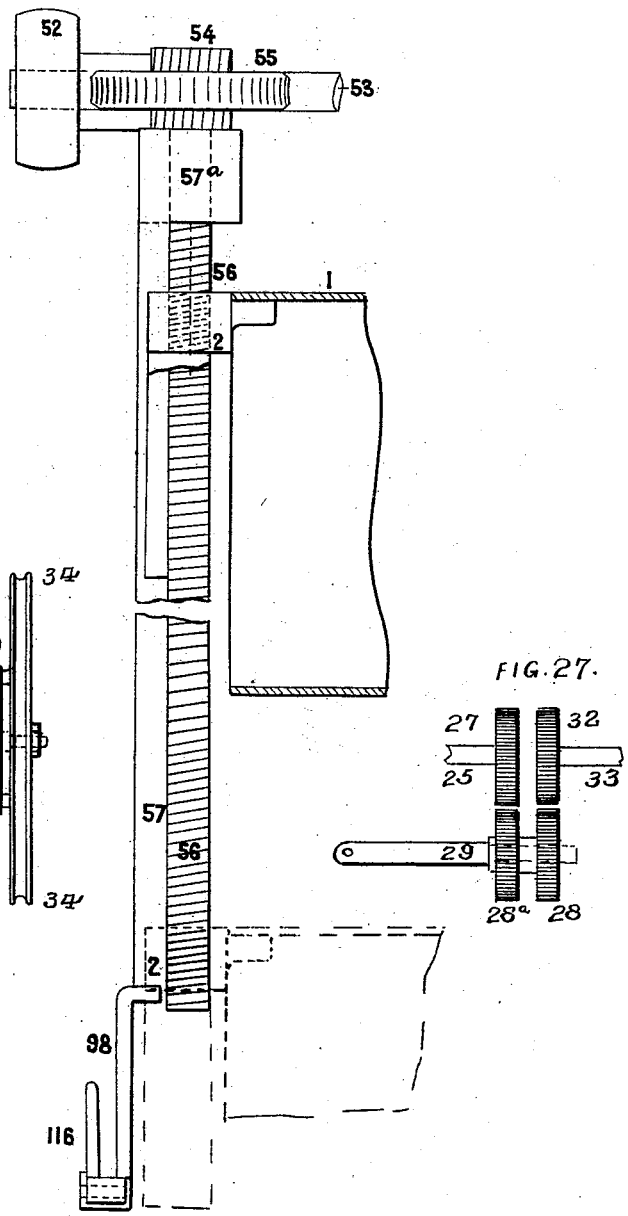

Figures 1, 2, and 3 show in cross-section, plan, and longitudinal section, respectively, a malting plant with four compartments provided with a single moving turning-over device. Figs. 4, 5, and 6 are detail views, in front elevation, end elevation, and plan, of the turning-over screws, with their shafts and gears. Fig. 7 is a diagram showing the arrangement of the driving-belts relatively to the transmission-pulley and the turning-over device. Fig. 8 shows in detail tension devices for the pulleys of the driving-belt. Fig. 9 shows in side elevation the main carriage of the apparatus, with its different parts. Fig. 10 is an elevation of the opposite side of said machine-frame. Fig. 11 is a plan view of the turning-over mechanism, the upper part being removed. Fig. 12 is a front elevation of the turning-over device, and Fig. 13 is a rear view of the same. Figs. 14, 15, and 16 are views in rear elevation, side elevation, and plan of the elevating-screws. Figs. 17 to 21 are detail views showing the mechanism for bringing the elevating devices into and out of action. Fig. 22 is a detail side elevation showing the parts operating at the end of a movement of the turning-over mechanism when the following movement is about to take place for raising or lowering the turning-over screws. Figs. 23, 24, and 25 and $23^a$, $24^a$, and $25^a$ and $23^b$, $24^b$, and $25^b$ are detail views showing the parts and the operation thereof of the turning-over mechanism. Fig. $24^c$ is a perspective view showing such parts assembled. Fig. 26 is a detail rear elevation showing the main driving-pulley of the machine with its adjacent pulley and the toothed wheels upon the driving-shaft for imparting movement to the turning-over device. Fig. 27 is a detail rear elevation showing the toothed wheels out of gear for stopping the operation of the turning-over mechanism. Figs. 28 and 29 are detail side elevations showing the toothed wheels and intermediate gears seen in Figs. 26 and 27 when brought into and out of engagement and the device for retaining them in the former position. Figs. 30 and 31 are detail rear elevations, partly diagrammatic, showing the means for regulating the movement of the carriage carrying the turning-over mechanism. Fig. $31^a$ is a perspective view of cams used in the turning-over mechanism. Fig. 32 is a diagram showing the operative connection between the main driving-pulley and the shaft which rotates the spiral shovels. Fig. 33 is a similar diagram showing some of the same parts with the addition of the devices which move the carriage upon its rails at a comparatively slow speed, as when the shovels are in operation. Fig. 34 is a further diagram showing the relation between the main driving-belt, the main driving-pulley, and the means by which motion is imparted to the raising and lowering mechanism and to the devices raising and lowering the spiral shovels. Fig. 35 is a diagram showing the relation between the main driving belt and pulley and the means for transmitting motion to the wheel-axles of the carriage when a faster motion of the same is required. Fig. 36 is a vertical section through the center of the shaft of one of the spiral shovels, its worm-wheel, &c., and showing in elevation the shovel, carriage-propelling gear, rack, &c., by which the turning-over apparatus is moved over the compartments.

Referring now to the details of the drawings by numerals, and first more particularly to the turning-over devices, it may be stated that the spiral shovels 18, (see Fig. 36,) carried by preferably hollow perforated shafts 15, mounted in tubular bearings 9 and carrying worm-wheels 16, operated by worms 26 on a shaft 25, are essentially the same as the corresponding parts shown in my patents above referred to, and as no claim is here made for them they require no particular description now, as my present invention relates more to the devices for giving the necessary motions to the various parts of the turning-over mechanism and the carriage therefor.

The upper carriage supporting the turnover mechanism consists of two vertical side frames 57 58, connected by frame-braces 59, between which is set an upright 64, carrying a bracket 64ᵃ to support shafts 70 and 79, further referred to hereinafter. This carriage is mounted on flanged wheels 62, which run on rails 101 and is moved by means to be subsequently described. Between these side frames is mounted a cylindrical frame 1, carrying the shovels, shafts, bearings, &c., heretofore referred to and having rigidly secured thereto the threaded slides or nuts 2, moving in vertical ways in the side frames 57 58. In these slides work vertical screw-shafts 56, supported in brackets 57ᵃ, as shown in Fig. 14, which as they turn raise or lower the frame 1 and with them the rotary shovels, &c. Each screw-shaft is provided with a worm-gear 55 (see Figs. 14, 15, and 16) upon its upper end, operated by a worm 54, the latter being carried by a horizontal shaft 53, which is driven by the following means:

In Fig. 1 a belt 112 is shown carried by pulleys 118 and 119, the former being on a power-shaft 117. The belt 112 runs parallel with and nearly over one of the rails 101 and is carried over the top of a tension-pulley 36, (see Figs. 7 and 9, in which the arrows show the course of the belt,) adjustable by a screw-shaft 38 in a frame 37. From this pulley said belt passes under an idler 35, then around a grooved pulley 34 upon the end of a shaft 33, which has bearings in the frame 57, its outer end projecting beyond the frame to receive the grooved pulley 34. The idler 35 is between the tension-pulley 36 and the grooved pulley 34 and so low down that the belt 112, after passing under the idler, embraces almost the entire periphery of the pulley 34. From this latter pulley it is carried under, behind, and over the top of the tension-pulley 36, which has a wide groove to carry both coils of the belt, and thence to the pulley 119, whereby rotary motion is given to the pulley 34 and its shaft 33 when the power-shaft 117 is running. The shaft 33 carries a spur-gear 32 near the inner side of the frame, and meshing with the same is a similar gear 28 on a shaft 29, (see Figs. 12, 26, and 27,) lying directly under the shaft 33. This shaft 29 has one end lying loosely on a bearing in the frame 57 and the other end supported by a forked bracket 29ᵃ, (see Fig. 12,) which straddles one of the transverse braces 59. Near the gear 28 on the shaft 29 is a second and similar gear 28ᵃ, which meshes with a gear 27 upon a shaft 25, which is in the same axial line with but independent of the shaft 33. This shaft 25 carries the worms 26, which drive the worm-gears 16 upon the ends of the shafts 15. The outer or free end of the shaft 29 is capable of a limited vertical adjustment, whereby the gears 28 and 28ᵃ may be disengaged from the gears 32 and 27, as seen in Figs. 27 and 29. When said gears are brought into engagement, as seen in Figs. 26 and 28, the shaft 29 is held up by a spring-pressed prop 30, pivoted on the frame and having a toe which is acted upon by a cam-shoulder 99, (see Figs. 28 and 29,) located at the point where the movement of the carriage terminates. This shoulder trips the toe and throws the prop 30 from beneath the end of the shaft 29, allowing it to drop and unmesh the gears by which the revolution of the shafts 15, carrying the spiral shovels 18, is caused to cease. The gears are reëngaged when desired by means of a hand-lever 31, fulcrumed on the frame 57 and having one end lying underneath the movable end of the shaft 29. The shaft 25 also carries a worm 26ᵃ, (see Figs. 11 and 12,) which meshes with a worm-gear 4 upon the end of a shaft 3, supported in a bearing 5 near the end of the hollow frame 1. On the other end of this shaft is a worm 6, (see Fig. 36,) which drives a worm-wheel 75, mounted on a shaft 73. On this latter shaft are toothed wheels 74, which engage a rack of teeth 102 on the sides of the rails 101, thereby propelling the carriage in either direction. When the shaft 73 is driven by the worm 6, as seen diagrammatically in Fig. 33, the wheels 74 have a direction of movement which propels the carriage forward during the operative action of the spiral shovels.

Upon the shaft 33 (see Fig. 9) and next to the pulley 34 is mounted a belt-pulley 39, having a flange to keep the belt on. The pulley 39 is belted to a pulley 43 by a belt 40, suitable tension being imparted by a tension-pulley 42, mounted on a pivoted tension-bar 41.

Adjoining pulley 43 is another pulley 45, (see Fig. 12,) from which belting, either crossed, as 81, or straight, as 82, according to the way the pulleys are desired to turn, may run to a pulley 50, having connected to it a smaller pulley 51, (shown in dotted lines,) from which runs a belt 50$^a$ to a pulley 52 on the shaft 53, (see Figs. 9, 12, and 34,) which carries the worms that operate the worm-wheels which raise and lower the frame 1, according to whether the straight belt or crossed belt is used. The pulley 45 is also used to carry the belts 81$^a$ or 82$^a$ to a pulley 80 on the shaft 79, which carries a worm 78, meshing with a worm-wheel 77 on a vertical shaft 70, having at its lower end a bevel-gear 71, (see Fig. 13,) meshing with a second bevel-gear 72 on the shaft 73, having at its ends the wheels 74, meshing with the rack 102. (See Figs. 13 and 36.) It is of course to be understood that the belts 81, 82, 81$^a$, and 82$^a$, just above referred to, are not to be all used at once, but according to that part of the apparatus desired to be operated and the direction in which it is to be run. The bevel-gear 71 is engaged with and disengaged from the gear 72 by the adjustability of the lower end of the shaft 70, pivoted at its upper end to a bracket 76 on the upright bar 64 and which has a bearing in a sleeve 69, which is movable upon the shaft 73. The sleeve is connected by a toggle-lever 68 with a rigid bracket on the frame 57. To the toggle-joint of the lever 68 is connected a rod 67. This rod is movable vertically in a bearing 65, supported by an arm projecting from the frame 57. (See Figs. 17 to 21.) On the upper end of the rod is a spring 66, (see Figs. 30 and 31,) which normally tends to raise said rod. On said rod are also stops 66$^a$, one above and one below the frame 1, which has an arm 83, moving vertically with the frame 1. On its upward movement this arm strikes the upper stop 66$^a$, lifts the rod 67, and engages the gears 71 and 72. On its downward movement the same arm 83 strikes the lower stop 66$^a$ and, forcing the rod downward, breaks the toggle-joint and disengages the gears. The operation of the wheels 74 carries the apparatus back to its starting-point after each operation. The revolution of the wheels 74 in the proper direction to produce this return movement is effected by the gear 71 and shaft 70, the latter being driven by the worm 78.

The tension-lever 41 is operated by a worm 85 (see Fig. 24$^c$) on a worm-shaft having a crank 86, the shaft being mounted in a frame 84, pivoted at one end 87, so that the worm can drop out of engagement with a toothed sector 41$^a$ on the lever 41 and concentric with the fulcrum of said lever. The movable end of the frame 84 rests on a cam 91, Figs. 23, 24, and 25, said cam being on a shaft which carries a regulating-wheel 88, which is operated by a small crank-shaft 90, having a worm 89 or a pinion 89', (see Fig. 24$^c$,) which meshes with suitable teeth on the periphery of the regulating-wheel 88. The face of this wheel has the figures "1," "2," "3" placed thereon at equal intervals. When the numeral "1" is uppermost, the cam 91 will have lifted the frame 84 and the worm 85 will be in mesh with the toothed sector 41$^a$. At the same time a prop 114$^a$, forming part of a weighted pivoted arm 114, will be released by a cam 92 on the shaft of the regulating-wheel and the prop will fall under the bar 84$^a$ at the end of the frame 84. The worm 85 being thus brought into mesh with the sector-gear 41$^a$, it is operated by the crank 86, and the lever 41 is turned thereby until the pulley 42 is pressed against the belt 40 in such manner as to draw it tight. This causes the worms 54 to operate the worm-gears 55 and raise the frame carrying the spiral shovels, and as said frame 1 reaches its highest point of movement an arm 83$^a$ thereon, sliding upon the rod 97, contacts with a stop 66$^b$, secured on the upper end of said rod. A centrally-pivoted lever 96 has one end pivotally secured to a projection of the weighted arm 114 and its other end secured in a like manner to the lower end of the rod 97. As the rod 97 is pulled upward by the movement just described it acts upon the short lever 96, thereby tripping the prop 114$^a$ from beneath the bar 84$^a$ of frame 84, which drops and releases the tension-pulley, and the movement ceases.

When the regulating-wheel is turned to bring the number "2" at the top, the mechanism is in position for effecting the accelerated return movement of the carriage. The shaft of the regulating-wheel 88 also has two cams 93 and 94 in addition to the cams 91 and 92, already explained. These cams are all shown in Figs. 24$^c$ and 31$^a$. The cam 93 is so arranged as to act upon an arm 116$^a$ of a weighted arm 116, mounted on the same axis that supports the prop 114. On one end of the weighted arm 116 is a rod or bar 98, the end of which will lie in the path of the slide 2, Figs. 15, 23$^b$, and 25$^b$, when the arm 116$^a$ is in position to support the frame 84 and bring the worm 85 in mesh with the sector 41$^a$. The tension-pulley 42 being thus adjusted, the screw-shafts are operated and the frame 1 descends. As it reaches its lowest point of movement the slide 2 strikes the bar 98 and draws the arm 116$^a$ from beneath the frame 84, which allows the tension-roller to also drop and thus stop the motion of the screws 56, letting the latter drop. This slide 2 is shown in two different positions in Fig. 15, one position being a little below its limit of upward adjustment and the other (shown in dotted lines) being the position in which it is when about to operate the rod 98 and lever 116ᵃ. The same parts are shown in substantially similar positions in Fig. 14, the chief difference being that a part of cylindrical frame 1 appears in section in each position.

In Figs. 22, 23, and 25, where the cams 91 and 92 are shown in different positions, I have for the convenience of illustration placed the cam 92 between the cam 91 and the wheel 88, the cams 93 and 94 being omitted. In practice, however, the series of cams have the arrangement shown in Fig. 24ᶜ and as indicated in Fig. 31ᵃ. It will be noted that the cams 92, 93, and 94 are substantially similar in form but timed differently. For example, in Fig. 23 cam 92 is shown as having such relation to cam 91 that it permits the arm 114ᵃ to drop under the frame 84 an instant before the tooth of cam 91 releases said frame. The cams 93 and 94 have the same relations to the two remaining parts of the three-toothed cam 91 as 92 has to the part shown in Fig. 23.

It might, perhaps, be possible to use a single cam 92 by removing two of the teeth on cam 91; but this would require the regulating-wheel 88 to be turned a full revolution every time the tension device was operated.

The cams 92, 93, and 94 operate the arms 114ᵃ, 116ᵃ, and 115ᵃ, respectively. The arm 114ᵃ is released or thrown out from under the end of frame 84 by the rod 97, operated by the arm 83ᵃ, when the frame 1 reaches its highest point. The arm 115 is operated to move the arm 115ᵃ from beneath the end of frame 84 by the inclined plane 100, Figs. 2, 23ᵃ, and 25ᵃ, to arrest the carriage. The arm 116ᵃ is operated for a similar purpose by the rod 98 when the frame 1 arrives at its lowest point.

In order to promptly arrest the various movements of the mechanism, I provide a spring-brake to act on the pulley 44. This brake consists of a lever 47, (see Fig. 9,) which operates an ordinary friction-band brake 47ᵃ acting on the pulley, a rod 48 connecting said lever 47 with a lever 49, which is so arranged that the end of the tension-lever 41 operates it as the tension-pulley 42 is thrown back, as it will be the moment the worm 85 is disengaged from the sector 41ᵃ. The brake is thus set at almost the same instant that the power is cut off.

I have shown a transferring-carriage 105, having wheels 107, which run on rails 108, set on the floor, for transferring the shovel-carriage from one compartment to another. This carriage is essentially the same as that fully shown and described in my Patent No. 440,850, and a further description is therefore unnecessary here, except to refer to the bridge 103 and the stop 100, which are not shown therein. The bridge 103 (see Fig. 1) is pivoted to the carriage and swings downward to make connection between the rails of the compartments and those on the transferring-carriage. The stop 100 (see Fig. 2) acts on the toe of the lever 30, and thus stops the motion of the shovel-carriage when the latter is on the transferring-carriage.

In order that my invention may be clearly understood, I will briefly describe the operation of the essential parts of the mechanism, and in order the better to understand the operation it will be advisable to refer to the diagrammatic Figs. 32, 33, 34, and 35, which respectively represent the different trains of gearing or belting by which is given the rotary motion to the shovels or screws, the slow forward motion of the turning-over apparatus over the compartment while the shovels are in action, the vertical movement of the shovels, and the quick backward movement of the turning-over apparatus over the compartment.

Supposing that the turning-over apparatus is on the transferring-car, the bevel-wheels 71 and 72 in mesh, as shown in Figs. 18 and 31, the machine properly belted, with the straight belt 82ᵃ in position, and the power-shaft 117 in motion, driving the belt 112, thus giving motion to the pulleys 34, 35, and 36, the shaft 33, and gear-wheel 32, the machine may be set in operation by tightening the belt 40, which is effected in the following manner: The wheel 88 is turned by means of the worm 89 and crank 90 until the numeral "3" is on top, as shown in Fig. 23ᵇ, which causes the cam 91 to lift the frame 84 and the cam 93 to allow the weight on the arm 116ᵃ to carry the vertical part of said arm under the bar 84ᵃ on the frame 84 and hold the worm 85 in contact with the segment 41ᵃ. If the worm 85 is now turned by the crank 86, the tension-roller 42 will be pressed against the belt 40, as shown in 24ᵇ, and motion thereby given to the train of belting, gearing, &c., shown diagrammatically in Fig. 35, whereby the shovel-carriage will be moved from the transfer-carriage over onto tracks 89 at the beginning of the compartment by the action of the belt 82ᵃ, pulley 80, worm 78, worm-wheel 77, gears 71 and 72, &c. As soon as the carriage is on the track over the compartment the worm 85 is turned in the reverse direction it was turned before, which will cause the tension-pulley 42 to drop, and the belt 40 being now slack no further effect is produced on the machine and it stops there for the next operation. The belt 82ᵃ is now removed and the straight belt 82 passed over the pulleys 45 and 50. The worm 85 is now turned as at first until the roller 42 again tightens the belt 40, when the train of belting, &c., shown in Fig. 34 operates the screws 56, and thus carries down the frame 1, carrying the spiral shovels, thus forcing the latter down into the grain and at the same time bringing down the worm 6 into mesh with the worm-wheel 75 and also the worm-wheels 16 into mesh with the worms 26. As the frame 1 descends the stud 83 attached thereto acts on the stop 66ᵃ and forces down the toggle-joint 68, thus throwing and holding the bevel-gears 71 and 72 out of mesh. As the screws 56 turn they carry down the slides 2, and when near the lower extremity of their motion one of them comes in contact with the rod 98, thus drawing away the arm 116ª from under the bar 84ª on the frame 84, which allows the tension-pulley 42 to fall back against the stop 113, as shown in Fig. 25ᵇ, and by slackening the belt 40 prevents the further operation of the screws 56, and the downward motion of the frame carrying the spiral shovels stops. The spiral shovels are now ready for their rotary motion in and their travel through the grain from end to end of the compartment. To give them these motions, the lever 31, Figs. 28 and 29, is moved by hand from the position shown in Fig. 29 to that shown in Fig. 28. This lifts the shaft 29, which brings the gears 28 and 32 into mesh, and they are thus held by the lever 30 being pushed by its spring under the end of the shaft 28. Connection between the gears 28 and 32 being thus made, the pulley 34 on the shaft 33, which carries the gear 32, being revolved by the belt 112, gives a rotary motion to the spiral shovels through the intermediate gearing shown in Fig. 32, and at the same time drives the entire turn-over mechanism from one end of the compartment to the other through the intermediate gearing shown in Fig. 33, which drives the wheels 74 over and along the rack 102. The spiral shovels are thus not only rotated to turn over the grain, but the shovels themselves and the mechanism connected therewith are driven along the entire compartment from front to rear. As soon as the shovels begin to approach the rear of the compartment the incline 99 (see Fig. 29) acts on the toe of the lever 30 and draws its upper end from under the shaft 29, which allows the pinions 28 and 32 to separate, as shown in Fig. 29, thus breaking the operative connection between the belt-driven pulley 34 and the trains of gearing shown in Figs. 32 and 33 and stopping the further rotation of the shovels and the travel of the apparatus over the compartment. To raise the shovels out of the grain, a cross-belt 81 should be substituted for the straight belt on pulleys 45 and 80. The regulating-wheel 88 is now moved to the position shown in Fig. 23, with the number "1" at the top, which causes the cam 91 to raise the frame 84 and bring the worm 85 into mesh with the segment 41ª, where it is held by the arm 114ª, the top of which has been carried under the bar 84ª of the frame 84, the cam 92, which has held it away from under the bar, having arrived at the proper position to allow this. The wheel 88 is now moved a trifle farther around to clear the cam 91 from the bottom of the frame, so as to allow the latter to rest solely on the top of arm 114ª. The belt 40 is now tightened as before, thereby setting in motion the train of belting, worm, worm-wheel, and screws shown in Fig. 34, thus raising the shovels out of the grain, and as the shaft 3, carrying the worm 6, is carried up with the shovels the connection between said worm and its worm-wheel 75 is broken. As the frame 1, carrying the spiral shovels, rises the lug 83ª (see Fig. 25) comes in contact with the stop 66ᵇ and by operating the lever 96 draws the arm 114ª out from under the bar 84ª, and thus allows the frame 84, lever 41, and tension-roller 42 to drop, which will stop the further rise of the shovels. This upward motion of the carriage will also throw the gear 71 into mesh with gear 72 by means of the arm 83 on the carriage acting on the stop 66ª, thus straightening the toggle 65, as shown in Figs. 18 and 31, should it not already have been straightened by the force of the spring 66. The turn-over apparatus is now carried back onto the carriage, and in order to save time I prefer to carry it back at a faster speed than would be given by the gearing shown in Fig. 33, which is done by the mechanism shown diagrammatically in Fig. 35, with the crossed belt 81 removed from the pulleys 45 and 50 and the cross-belt 81ª set on pulleys 45 and 80. To set this mechanism in motion, the wheel 88 is turned until the number "2" is on the top, which raises the frame 84 and allows the arm 115ª to pass under the bar 84ª, as shown in Fig. 23ª, under which it is carried by the weight 115. The frame 84 being now raised, the worm 85 is operated until the wheel 42 presses the belt 40 tight, and thus gives motion to the train of belts and gearing shown in Fig. 35 in the reverse direction it before traveled, whereby a comparatively rapid motion is given to the turn-over apparatus back over the compartment, where it has been acting on the grain; but its travel ceases as soon as the weight 115 is lifted by the incline 100 on the transfer-carriage. The transfer-carriage is now moved to the next compartment and the operation repeated.

It should be understood that whether straight or crossed belts are used at either of the operations will depend upon whether a right or left hand worm is used to operate the worm-wheels 55 and 77.

It is evident that the mechanism shown in Fig. 35 may be used for driving the shovel-carriage in both directions over the compartment by changing the crossed belt for a straight belt or the reverse.

Having thus described my invention, what I claim is—

1. In a mechanical turning-over device for malting grain, the combination with spiral shovels mounted on vertical shafts, of a frame in which the shafts have bearing, means for automatically raising and lowering said frame, a tension-pulley acting on the belt of a main pulley, to draw said belt into operative engagement with said pulley, and means for automatically releasing said tension-pulley at the completion of the operation of the machine, whereby the operation of the shovels and the movement of the carriage both cease, substantially as described.

2. In a mechanical turning-over apparatus for malting grain, the combination with a traveling carriage of the improved turning-over mechanism consisting of spiral shovels, shafts carrying said shovels, a frame to support the shaft, means for revolving the latter, screws for raising the frame and lowering it, a tension-pulley to preserve the operative tension of the belt, means for automatically releasing said pulley at the end of the raising or lowering movement, a movable shaft carrying all of the gears imparting motion to the mechanism, means for automatically dropping said shaft at the end of the turning-over movement, and a single transverse carriage for transporting the upper carriage to another compartment for working, substantially as described.

3. In a mechanical turning-over apparatus for malting grain, the combination with a main pulley of a tension-pulley, a lever on which the tension-pulley is mounted, a toothed sector on said lever, a worm adapted to mesh therewith, a pivoted frame carrying said worm, a prop supporting the frame when the worm is in mesh, and means for automatically removing said prop, substantially as described.

4. In a mechanical turning-over apparatus for malting grain, the combination with the main driving-pulley of a tension-lever and pulley, a toothed sector on the lever, a worm adapted to mesh therewith, a pivoted frame carrying the worm, a prop to support said frame when the worm is meshed with the sector on the tension-lever, a friction-brake to engage a driven pulley, and a lever to set said brake, the end of said lever being in the path of the end of the tension-lever when the latter is released, substantially as described.

5. In a mechanical turning-over apparatus for malting grain, the combination with a carriage and with wheels which propel said carriage, of a driving-pulley, a gear driven by said pulley, a movable shaft carrying said gear, a toggle-lever to move said shaft, a rod connected to said lever, and a device for operating said rod to throw the gear into and out of mesh, said device being operated by a movable part of the apparatus, substantially as described.

6. In a mechanical turning-over mechanism for malting grain, the combination with spiral shovels on vertical shafts, of a frame carrying said shafts, a carriage on which said frame is mounted, means for propelling said carriage, a gear through which movement is transmitted, a vertically-movable shaft carrying said gear, a prop to support the shaft and keep the gear in mesh, and a cam projection on the rail along which the carriage travels, to engage a toe on the prop and remove it from beneath said shaft to unmesh the gear and arrest the movement, substantially as described.

7. The combination in a mechanical turning-over device, of a track arranged over a grain-compartment, a carriage running on said track carrying rotating shovels, means for giving said shovels a motion lengthwise of the compartment, through the grain, a motion for raising the shovels out of the grain and then returning the shovels to the starting-point, all operated by the same power, substantially as described.

8. The combination in a mechanical turning-over device, of a track arranged over a grain-compartment, a carriage running on said track carrying shovels for turning the grain, means for giving said shovels vertical motion into the grain, a rotary motion therein, a horizontal motion through the grain, a vertical motion out of the same, and a return motion to the starting-point, all operated by the same belt, substantially as described.

9. The combination in a mechanical turning-over device, of a series of tracks, arranged over a series of grain-compartments, a transferring-carriage, a carriage running on said tracks carrying shovels for turning the grain, means for giving vertical motion to said shovels to force them into the grain, a rotary motion in the same, a horizontal motion from end to end of the compartment, a motion to lift them out of the grain, and to return them to the starting-point and onto the transfer-carriage, all operated by the same power, substantially as described.

10. The combination in a mechanical turning-over device, of a series of tracks arranged over a series of grain-compartments, a transfer-carriage, a carriage adapted to run on said tracks carrying shovels for turning the grain, means for transferring the shovel-carriage from the transfer-carriage to the tracks, for forcing the shovels into the grain, for giving the shovels a rotary motion in and horizontally through the grain, a rising motion through the grain at the end of the horizontal motion, and for returning the shovel-carriage to the transfer-carriage, all operated by the same power, substantially as described.

11. The combination in a mechanical turning-over device, of a track set over a grain-compartment, a carriage running on said tracks carrying a series of shovels, means for giving said shovels a vertical motion into the grain in the compartment, and means for stopping said vertical motion automatically, substantially as described.

12. The combination in a mechanical turning-over device, of a track set parallel with a grain-compartment, a carriage running on said track carrying a series of shovels, means for simultaneously giving said shovels a rotary motion in the grain, and a horizontal one through the same, and automatic means for stopping said motions as the shovels reach the end of their horizontal travel, substantially as described.

13. The combination in a mechanical turning-over device, of a track set parallel with a grain-compartment, a carriage running on said track carrying a series of shovels, means for raising said shovels clear of the grain at the end of its travel through the same, and means for automatically stopping the upward motion of the shovels, substantially as described.

14. The combination in a mechanical turning-over device, of a series of tracks arranged parallel with a series of grain-compartments, a transferring-carriage, a carriage adapted to run over said tracks, and carrying a series of rotary shovels, means for moving said shovels through and out of the grain and then carrying the shovel-carriage back toward its starting-point and onto the transferring-carriage, and automatic devices for stopping said backward motion, substantially as described.

In testimony whereof I have signed this specification in the presence of two subscribing witnesses.

JULES ALPHONSE SALADIN.

Witnesses:
CLYDE SHROPSHIRE,
W. TOULY.